(12) United States Patent
Basaraba

(10) Patent No.: US 8,185,444 B1
(45) Date of Patent: May 22, 2012

(54) INTERACTIVE ONLINE READING SYSTEM

(76) Inventor: Maxim Z. Basaraba, Sacramento, CA (US)

( * ) Notice: Subject to any disclaimer, the term of this patent is extended or adjusted under 35 U.S.C. 154(b) by 0 days.

(21) Appl. No.: 12/841,852

(22) Filed: Jul. 22, 2010

(51) Int. Cl.
   *G06Q 30/00* (2006.01)
(52) U.S. Cl. .................................................. 705/26.1
(58) Field of Classification Search ............ 705/26, 705/27, 26.1
   See application file for complete search history.

(56) References Cited

U.S. PATENT DOCUMENTS

| | | | |
|---|---|---|---|
| 5,734,823 A | 3/1998 | Saigh et al. | |
| 5,802,516 A | 9/1998 | Shwarts et al. | |
| 5,825,876 A | 10/1998 | Peterson, Jr. | |
| 5,970,231 A | 10/1999 | Crandall | |
| 6,633,877 B1 | 10/2003 | Saigh et al. | |
| 7,401,286 B1 | 7/2008 | Hendricks et al. | |
| 7,406,516 B2 | 7/2008 | Davis et al. | |
| 7,527,498 B2 | 5/2009 | Matsoff | |
| 2001/0007980 A1 | 7/2001 | Ishibashi et al. | |
| 2003/0059762 A1 | 3/2003 | Fujiwara et al. | |
| 2003/0193523 A1 | 10/2003 | Johnson | |
| 2003/0210226 A1 | 11/2003 | Ho et al. | |
| 2004/0059622 A1 | 3/2004 | Mueller | |
| 2007/0005616 A1* | 1/2007 | Hay et al. | 707/100 |
| 2007/0116526 A1 | 5/2007 | Gifford et al. | |
| 2007/0255580 A1 | 11/2007 | Cole et al. | |
| 2008/0091796 A1* | 4/2008 | Story et al. | 705/400 |
| 2009/0163188 A1* | 6/2009 | Hiller | 455/414.3 |
| 2009/0177583 A1* | 7/2009 | Wen et al. | 705/52 |
| 2009/0182566 A1 | 7/2009 | Bhogal et al. | |
| 2009/0216623 A1 | 8/2009 | Hendricks et al. | |
| 2009/0313380 A1* | 12/2009 | Kurihara | 709/230 |
| 2011/0093905 A1* | 4/2011 | McKinley et al. | 725/92 |

* cited by examiner

*Primary Examiner* — Mila Airapetian
(74) *Attorney, Agent, or Firm* — Dennis A. DeBoo

(57) ABSTRACT

An interactive online reading system for reading online digital content such as digital books including textbooks for a period of purchased time which is counted down only during a user activated reading session and wherein the countdown of the period of purchased time can be subsequently paused or stopped by the user for controlling costs over the user's reading and learning preferences.

15 Claims, 14 Drawing Sheets

INTERACTIVE ONLINE READING SYSTEM

FIELD OF THE INVENTION

This invention relates generally to reading systems and, in particular, to an interactive online reading system for reading digital content for a period of purchased time which is counted down only during a user activated reading session and wherein the countdown of the period of purchased time can be subsequently paused or stopped by the user for controlling costs over the user's reading and learning preferences. Examples of digital content include, but are not limited to, digital articles, briefs, books including textbooks, class notes, lectures, patents, patent applications, magazines, newspapers, presentations, readers, reports, researches, dissertations, reviews, essays, thesis, et cetera.

BACKGROUND OF THE INVENTION

A digital book is also known as an e-book is defined by the Oxford Dictionary of English, as "an electronic version of a printed book which can be read on a personal computer or hand-held device designed specifically for this purpose." E-books are usually read on dedicated hardware devices known as e-Readers or e-book devices. Personal computers and some cell phones can also be used to read e-books.

Numerous e-book formats have emerged and proliferated, some supported by major software companies, and others supported by independent and open-source programmers. Multiple readers naturally followed multiple formats, most of them specializing in only one format, and thereby further fragmenting the e-book market.

To add to this fragmentation, the price of an e-book reader far exceeds that of a single book, and e-books often cost the same as their print versions. Due to the high cost of the initial investment in some form of e-reader, e-books are cost prohibitive to a large amount of the world's population.

Furthermore, the formats and file types that e-books are stored and distributed in change over time, for instance from advances in technology or the introduction of new proprietary formats. While printed books remain readable for many years, e-books may need to be copied to a new carrier over time.

Notwithstanding, e-books have many advantages some of which include: the ease and cost of publishing and distributing e-books, the ease of updating previous editions of e-books, the immediate availability of e-books as opposed to going to a bookshop or awaiting delivery of a printed book, the ability to translate books into many different languages, making the works available to speakers of languages not covered by printed translations, and the environmental benefits of not consuming paper and ink and, in general, utilizing far less raw materials.

Accordingly, there is there is a need to overcome the significant shortcomings delineated hereinabove, to retain the advantages noted hereinabove, and to provide new innovations.

BRIEF SUMMARY OF THE INVENTION

Accordingly, and in one aspect, an embodiment of the invention ameliorates or overcomes one or more of the significant shortcomings of the known prior art by providing an interactive online reading system for reading online digital content such as digital books including textbooks for a period of purchased time which is counted down only during a user activated reading session and wherein the countdown of the period of purchased time can be subsequently paused or stopped by the user for controlling costs over the user's reading and learning preferences.

In another aspect, an embodiment of the invention provides a computer-implemented online interactive reading method, said method comprising the steps of: counting down a value correlative to an amount of time purchased for accessing digital content selected by a user only while the user selected digital content is displayed on a display for user interpretation; and allowing the user to control a subsequent suspension of the counting down of the value in return for the selected digital content being concealed from the display. Additionally, an embodiment of the invention provides a non-transitory computer-readable medium containing computer-executable instructions that, when executed by a processor, cause the processor to perform the above online interactive reading method. Furthermore, an embodiment of the invention provides a system comprised of means for accomplishing the functions of the steps of the above online interactive reading method.

In a further aspect, an embodiment of the invention provides a computer-implemented online interactive reading method, said method comprising the steps of: counting down a purchased amount of time under control of a user actuated set of icons, the set of icons including a first icon button to start counting down the purchased amount of time, a second icon button to pause counting down the purchased amount of time, and a third icon button to stop counting down the purchased amount of time; and displaying user selected digital content on a display of a client sent from a server networked to the client only when the first icon button has been actuated by the user and until the second icon button is actuated by the user to pause counting down the purchased amount of time or until the third icon button is actuated by the user to stop counting down the purchased amount of time or until counting down the purchased amount of time expires. Additionally, an embodiment of the invention provides a non-transitory computer-readable medium containing computer-executable instructions that, when executed by a processor, cause the processor to perform the above online interactive reading method. Furthermore, an embodiment of the invention provides a system comprised of means for accomplishing the functions of the steps of the above online interactive reading method.

Accordingly, it should be apparent that numerous modifications and adaptations may be resorted to without departing from the scope and fair meaning of the claims as set forth herein below following the detailed description of the invention.

DETAILED DESCRIPTION OF THE INVENTION

Figure 1:
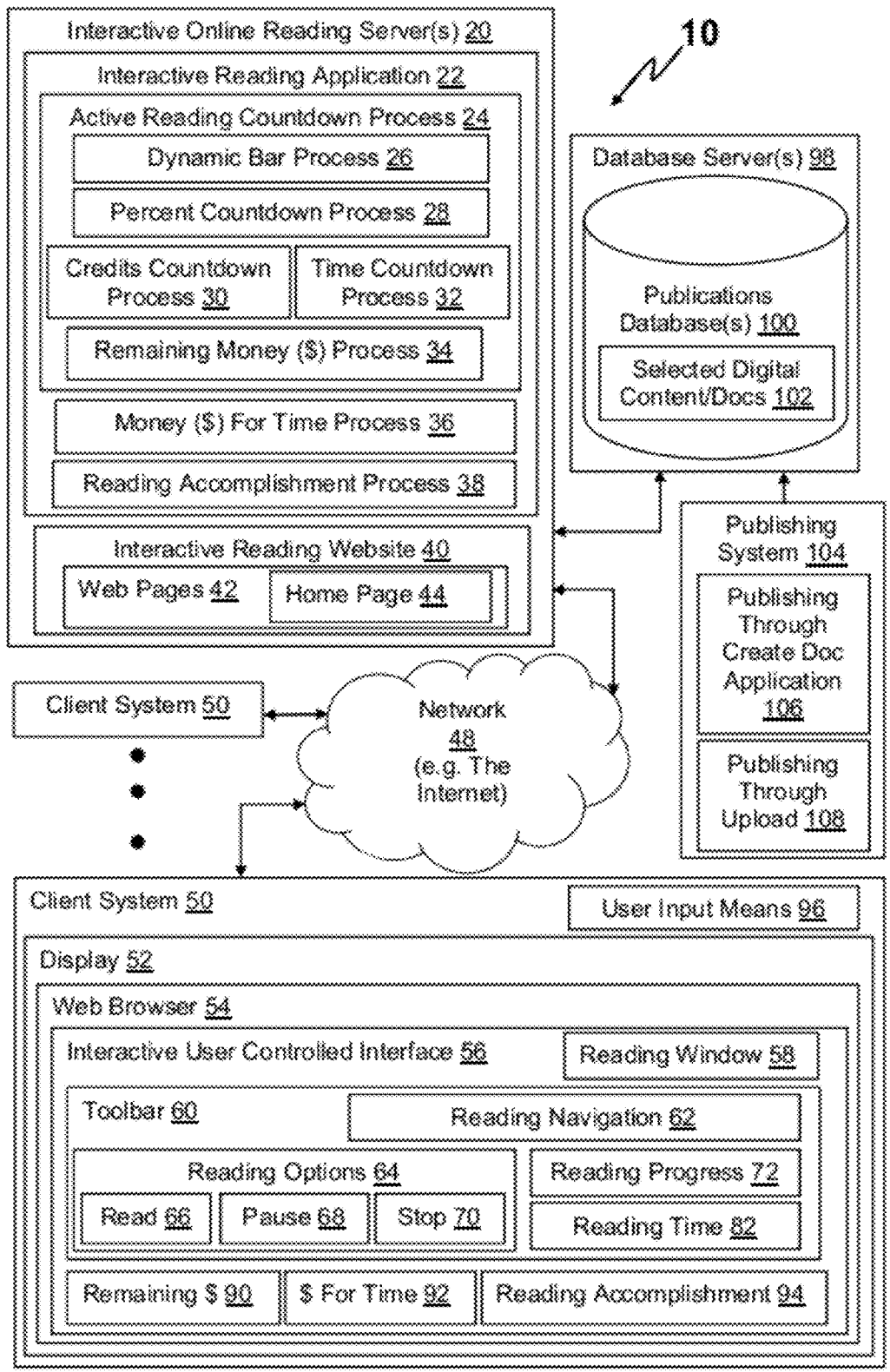
FIG. 1 is an exemplary block diagram illustrating an embodiment of an interactive online reading system.

Considering the drawings, wherein like reference numerals denote like parts throughout the various drawing figures, reference numeral 10 is directed to an interactive online reading system 10 for reading digital content for a period of purchased time counted down only during one or more active reading periods.

System Hardware Overview

Referring to FIG. 1, and in an exemplary embodiment, the interactive online reading system 10 is comprised of an interactive online reading server 20, at least one user device or client system 50 operatively coupled to the interactive online reading server 20 via one or more computer networks 48, such as the Internet 48. Additionally, the interactive online reading system 10 is further comprised of a database server 98 operatively coupled to the interactive online reading server 20 and a publishing system 104 operatively coupled to the database server 98 for managing content published to the database server 98. In one embodiment, the publishing system 104 comprises a create document (Doc) application 106 and an upload application 108 through which publishing can be accomplished by one or more users of one or more client systems 50.

In one embodiment, the interactive online reading server 20 and one or more of the client systems 50 can be, for example, a machine within which a set of instructions may be executed for causing the machine to perform any one or more of the methodologies delineated herein. Further, the term "machine" can also be taken to include any collection of machines that individually or jointly execute a set (or multiple sets) of instructions to perform any one or more of the methodologies discussed herein.

Figure 2:
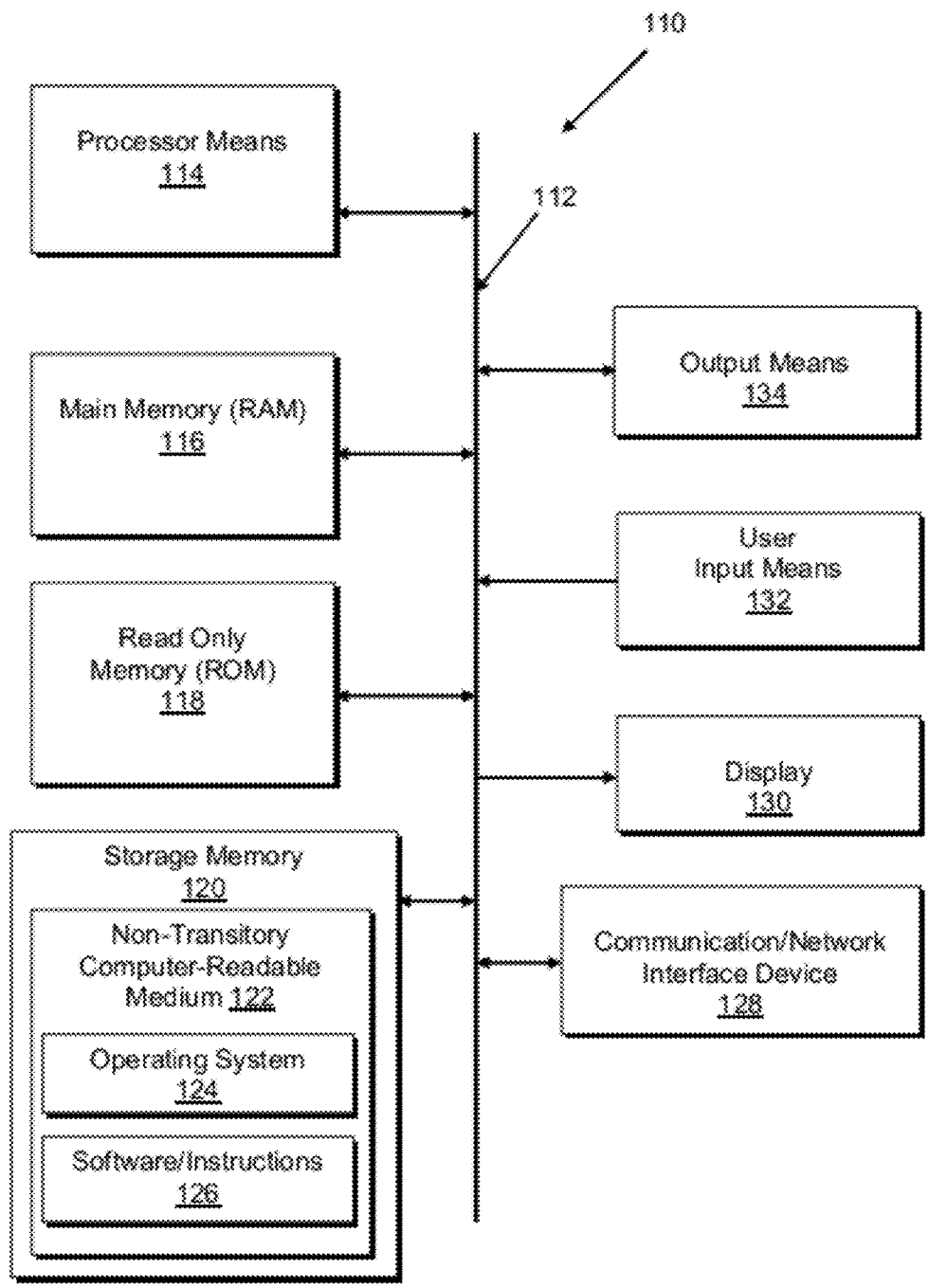
FIG. 2 is an exemplary block diagram illustrating a machine in an example form of a computer system which can generally define a server or client system of an embodiment of the interactive online reading system.

FIG. 2 generally illustrates an exemplary diagram of the machine in the form of a computer system 110 comprised of a bus 112, a processor means 114 (e.g., one or more central processing units (CPUs), one or more graphics processing units (GPUs), or both), RAM or main memory 116, read only memory (ROM) 118, and a storage memory 120 comprising a non-transitory computer-readable medium 122. The computer system 110 also includes a communication or network interface device 128 for communicating with another machine or system via a network, such as Network 48. Furthermore, the computer system 110 includes a display 130 (e.g., a liquid crystal display (LCD) or a cathode ray tube (CRT)) and user input means 132 such as a keyboard, a mouse, a pen, a trackball, a remote control, a joystick, a touch screen, a keypad, voice and/or speech recognition and/or biometric mechanisms, et cetera. Moreover, the computer system 110 may include an output means 134 such as a printer, a speaker, et cetera. In one embodiment, bus 112 includes one or more conductors that permit communication among the components of the computer system 110.

In one embodiment, the non-transitory computer-readable medium 122 stores software or instructions 126 embodying or utilized by any one or more of the methodologies or functions described herein. The software or instructions 126 may also reside, completely or at least partially, within the RAM memory 116 and/or within the processor means 114 during execution thereof by the computer system 110, the RAM memory 116 and the processor means 114 also constituting non-transitory computer-readable media. Software or instructions 126 may further be transmitted or received over the network 48 via the network interface device 128 utilizing any one of a number of well-known transfer protocols (e.g., HTTP).

While the non-transitory computer-readable medium 122 is shown in an example embodiment to be a single medium, the non-transitory computer-readable medium 122 should be taken to include a single medium or multiple media that is capable of storing, encoding, or carrying a set of instructions for execution by the computer system 110 and that cause the computer system 110 to perform any one or more of the methodologies or functions described herein, or that is capable of storing, encoding or carrying data structures utilized by or associated with such a set of instructions. The term "non-transitory computer-readable medium" shall accordingly be taken to include, but not be limited to, magnetic media (such as hard disks, floppy disks, etc.), optical media (such as compact discs, digital video discs, Blu-ray discs, etc.), semiconductor media (such as non-volatile flash memory employed in, for example, Solid-state drive (SSD) devices, electrically programmable read only memory (EPROM), electrically erasable programmable read only memory (EEPROM), etc.), any suitable media that is not fleeting or devoid of any semblance of permanence during transmission, and/or any suitable tangible media. Additionally, non-transitory computer readable medium 122 may be employed for at least a portion of RAM 116. Furthermore, the non-transitory computer readable medium 122 and storage memory 120 can be formed from one or more different types of media or memory.

Communications Overview

Referring now to FIGS. 1 and 2, wired and wireless connections between user devices or client systems 50 and the Internet 48 along with protocols and components for communicating via the Internet 48 are well known to those of ordinary skill in the art of computer network communications. For example, it is well-known in the art of computer networking that the Internet 48 is a collection of networks and gateways that utilize a TCP/IP suite of protocols wherein TCP/IP is a dual acronym for Transmission Control Protocol/Internet Protocol.

The interactive online reading server 20 is generally comprised of a computer system 110 running a server operating system which is an embodiment of the operating system 124 that is responsible for the TCP/IP communications. The interactive online reading server 20 comprises an interactive reading application or programming 22 and one or more web pages 42 including home page 44 to create an interactive reading website 40.

One or more user devices or client systems 50 are also generally comprised of a computer system 110 running both an operating system which is an embodiment of the operating system 124 that is responsible for the TCP/IP communications and a software application known as a web browser 54. Using TCP/IP, at least one user device or client system 50 employs the web browser 54 to issue HTTP requests to the interactive online reading server 20. The request can be, for example, a URL (Uniform Resource Locator) address for the home page 44 of the interactive reading website 40. For example, the unique Uniform Resource Locator address, "http://www.bookstep.com" specifies a hypertext-transfer protocol ("http") and a pathname of the server ("www.bookstep.com"). In turn, the interactive online reading server 20 includes and executes server software that presents information as HTTP responses in the form of the home page 44 constructed from a Markup Language, and/or other server-generated application or data which is displayed by the web browser 54 via a display 52 of the user device or client system 50 wherein display 52 is an embodiment of the display 130 of the computer system 110. Most web browsers 54 have modern graphical user interfaces that are capable of displaying and manipulating various types of data. A graphical user interface is a type of display format that enables a user to choose commands, start programs, and see lists of files and other options by pointing to pictorial representations (icons) and lists of menu items on the display. Choices can be activated generally by a user input means 96 wherein user input means 96 is an embodiment of the user input means 132 of the computer system 110.

The interactive online reading server 20 is also generally responsible for digital content browsing, searching, and finding services in cooperation with one or more database servers 98 which is comprised of one or more digital publications databases 100 of digital content or documents (Doc) in the form of, but not limited to, digital articles, briefs, books including textbooks and wherein books include eBooks defined as an electronic edition of a physical book or textbook, class notes, lectures, patents, patent applications, magazines, newspapers, presentations, readers, reports, researches, dissertations, reviews, essays, thesis, et cetera. The digital content or documents in the one or more digital publications databases 100 can be arranged in predefined categories or classes.

In general, the digital publications database 100 is accessed and controlled through a common gateway interface. When the interactive online reading server 20 receives a request for a database query from a user device or client system 50, it forwards the request to the one or more database servers 98 for processing. The database server or servers 98 retrieve results from one or more databases 100 that match the query criteria and return the results to the interactive online reading server 20 via the common gateway interface. The interactive online reading server 20 then sends a web page including the results back to the user device or client system 50 wherein the web page including the results are displayed by the web browser 54 via the display 52 of the user device or client system 50. The desired digital content can then be selected by the user by utilizing the user input means 96. Digital content can also be selected from a previously saved user selection of digital content, from a selection of digital content automatically presented by the interactive online reading server 20, or from a user selected category that is automatically or query populated by the interactive online reading server 20. The user selected digital content or document 102 is then retrieved from the digital publications database 100 by the interactive online reading server 20 as delineated above and displayed to the user via an interactive user-controlled interface 56.

Interactive User-Controlled Interface

Figure 3:
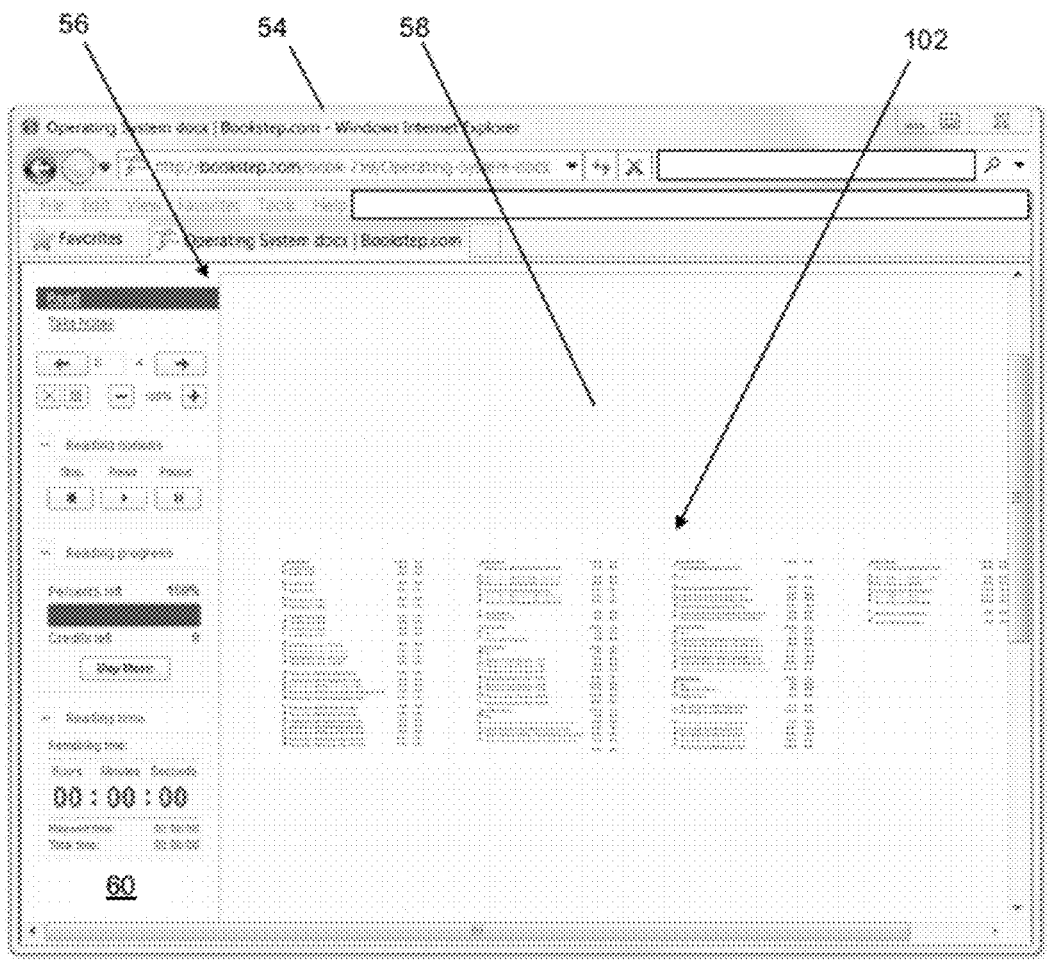
FIG. 3 is a screenshot view illustrating a web browser and an embodiment of an interactive user-controlled interface of the interactive online reading system, the interactive user-controlled interface showing a preview of selected digital content in a reading window.

FIG. 3 illustrates an embodiment of the interactive user-controlled interface 56 being displayed on the web browser 54 via the display 52 (FIG. 1) of at least one user device or client system 50 for providing an enhanced reading and/or learning experience of selected digital content or document 102 retrieved from the digital publications database 100 by the interactive online reading server 20.

In one embodiment, and as illustrated in FIG. 3, a preview of one or more pages of the selected digital content 102 is displayed as, for example, one or more thumbnails, tiles, or icons in a reading window 58 of the interactive user-controlled interface 56.

Additionally, and in one embodiment, the interactive user-controlled interface 56 is comprised of a reading navigation, option, and information toolbar 60. Although the reading navigation, option, and information toolbar 60 is illustrated on the left side of the reading window 58 in FIG. 3, it can be alternatively be located on top, below, or to the right of the reading window 58 or it may be designed to be able to float around in the interactive user-controlled interface 56.

Reading Navigation, Option, and Information Toolbar

Navigation Section

Figure 4:
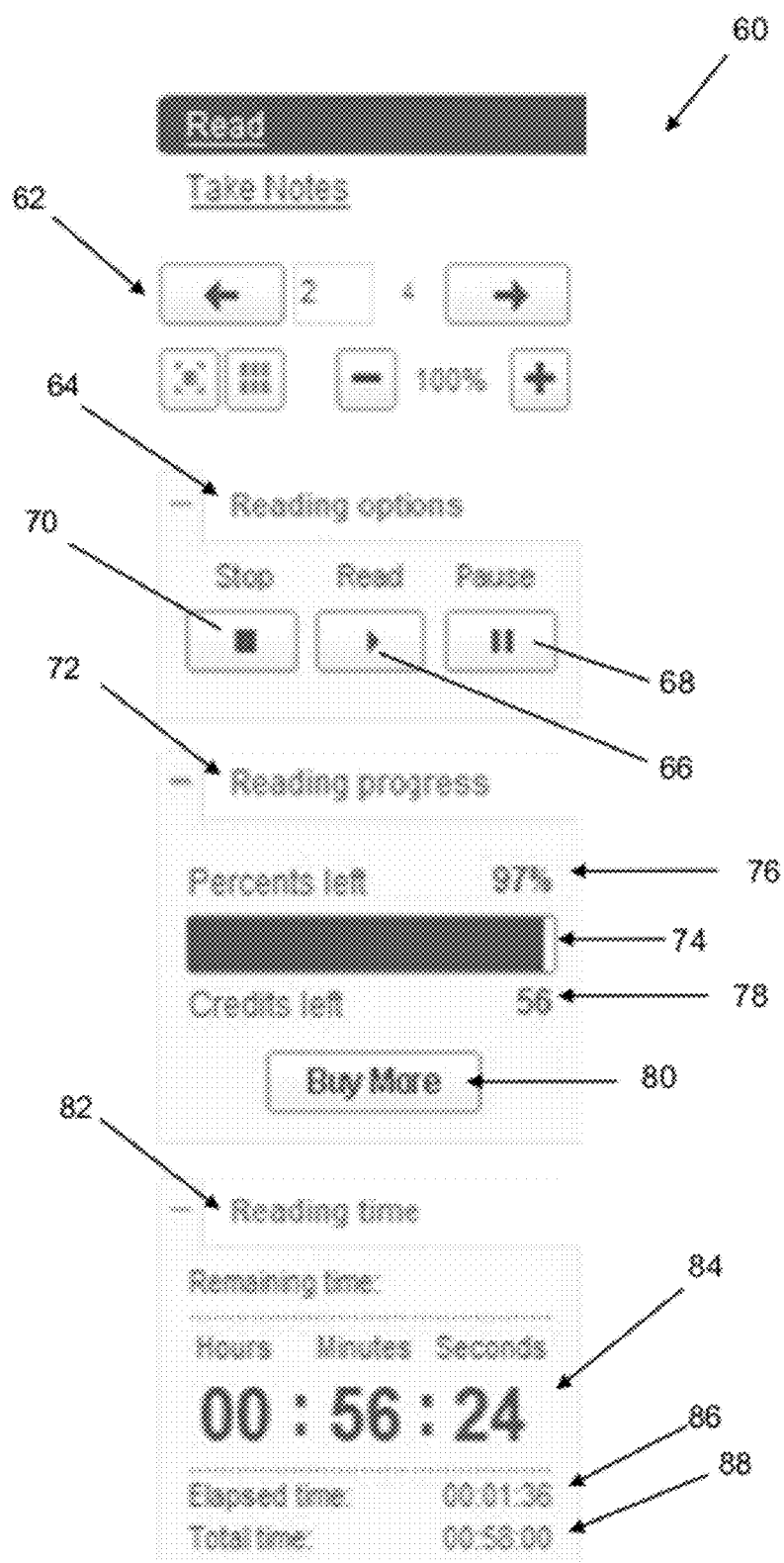
FIG. 4 is a screenshot view illustrating a reading navigation, option, and information toolbar of an embodiment of the interactive user-controlled interface.

Referring to FIGS. 1 and 4, the reading navigation, option, and information toolbar 60 is comprised of a reading navigation section 62 comprised of page forward and page back buttons aligned in a row followed by a row of page view and page size buttons. Above the reading navigation section 62, is a take notes option which when selected opens a word processing interface for taking notes on the selected digital content.

Reading Option Section

Disposed below the reading navigation section 62 is a reading options section 64. The reading options section 64 is comprised of a user actuated set of icons, the set of icons comprises a first icon button 66 to read the selected digital content or document 102 and to start a countdown process 24, a second icon button 68 to pause the countdown process 24 and hide the selected digital content or document 102, and a third icon button 70 to stop the countdown process 24 and remove the selected digital content or document 102.

Reading Progress Section

Disposed below the reading options section 64 is the reading progress section 72. The reading progress section 72 is comprised of a reading progress bar 74 driven by the dynamically decreasing bar process or dynamic bar process 26 for displaying a dynamically decreasing reading bar or a moving indicator correlative to reading progress or to a countdown of time and/or credits purchased for an active reading session by also employing the credit and time countdown process 30 and 32, respectively. Above the bar 74, is a numerical display 76 driven by the percent countdown process 28 for displaying the percent left of an amount or period of purchased time and/or an amount of purchased credits or to a percent of material left for reading. Below the bar 74, is a numerical display 78 driven by the credit left countdown process 30 for displaying the credits left in the amount of purchased credits. Additionally, the reading progress section 72 includes a buy more button 80 for buying more reading access time or correlative credits.

Reading Time Section

Disposed below the reading progress section 72 is the reading time section 82. The reading time section 82 is comprised of a remaining time display or a time countdown display 84 driven by the time countdown process 32 for displaying the remaining amount of purchased time in hours, minutes, and seconds. Additionally, the reading time section 82 is comprised of an elapsed time display 86 and a total purchased time display 88 both also driven by the time countdown process 32 for respectively displaying elapsed and total times in hours, minutes, and seconds. Hence, the remaining time or time countdown display 84 reflects how much reading access time remains and provides a time countdown display, the elapsed time display 86 reflects how much reading time has elapsed, and the total time display 88 reflects how much reading access time was purchased.

Toolbar Use and Operation

Figure 5:
FIG. 5 is a screenshot view illustrating the interactive user-controlled interface in an exemplary active reading session.

In use and operation, and as illustrated in the embodiment of FIGS. 4 and 5, the reading options section 64 is comprised of icons represented by user selectable Read or Start button 66 flanked on one side by user selectable Pause button 68 and on the other side by user selectable Stop button 70 thereby providing a user control means for starting, pausing, and stopping the countdown process 24 using user input device 96 (FIG. 1) in the form of, for example, a mouse, keyboard, or touch screen for controlling the countdown of a period of purchased time (58 minutes in this example) and/or amount of purchased credits (58 credits in this example) for allowing the user to only pay for an active reading period or session during which the selected digital content 102 is displayed for reading in the reading window 58 of the interactive user-controlled interface 56 as illustrated in FIG. 5. Hence, the period of purchased time or the correlative amount of purchased credits starts to be counted down only when the user selects/actuates the read/start button 66 for starting the active reading period or session. When the user selects/actuates the Pause button 68 during the active reading period or session, the countdown of the period of purchased time or the correlative amount of purchased credits is paused and the selected digital content is hidden or removed from the reading window 58 thereby precluding the reading thereof. If the user subsequently selects/actuates the read/start button 66, the selected digital content is once again displayed to the user for reading and the countdown of the period of purchased time or the correlative amount of purchased credits resumes for a subsequent active reading period or session. When the user selects/actuates the stop button 70, the countdown of the period of purchased time or the correlative amount of purchased credits is stopped thereby ending an active reading period or session and removing the selected digital content from the view of the user. Accordingly, the period of purchased time or the correlative amount of purchased credits is only counted down during one or more active reading periods and if the user, at any time, selects or actuates the pause button 68 or the stop button 70, the countdown of the period of purchased time or the correlative amount of purchased credits is respectively paused or stopped.

Furthermore, and referring to FIG. 1, the reading navigation, option, and information toolbar 60 may be further comprised of a remaining money display 90 driven by a remaining money process 34 for displaying an amount of money that remains for use in continuing one or more active reading sessions or that can be received in a form of a unused money refund, a money paid for time display 92 driven by a money for time process 36 for displaying a total amount of money paid for the total amount of purchased time, and a reading accomplishment display 94 driven by a reading accomplishment process 38 for displaying a percentage of the amount of the selected digital content that the user has read.

Interactive Online Reading Process

Figure 6:
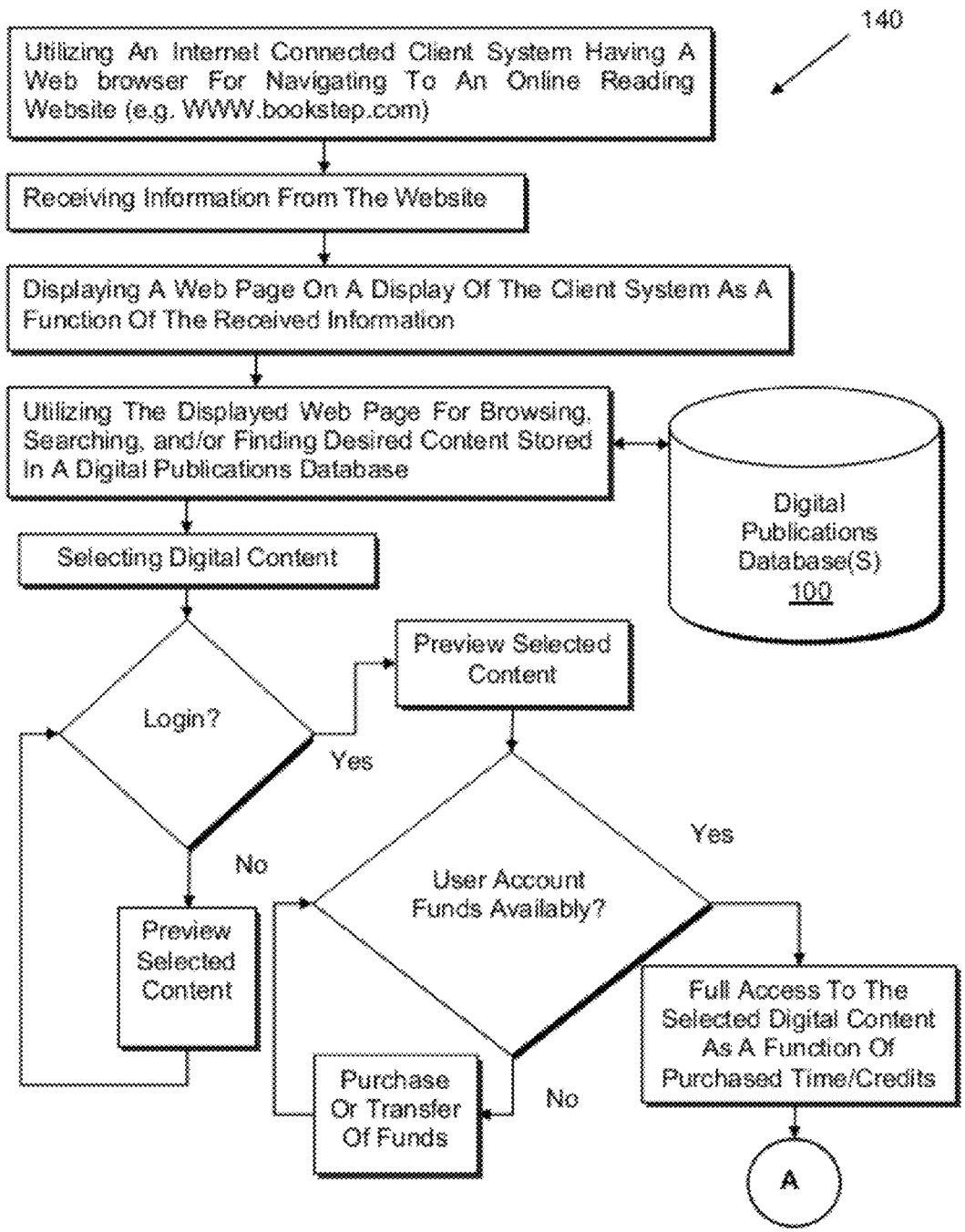
FIGS. 6 and 7 are general flow diagrams of an embodiment of an interactive online reading process or method of the interactive online reading system.
Figure 7:
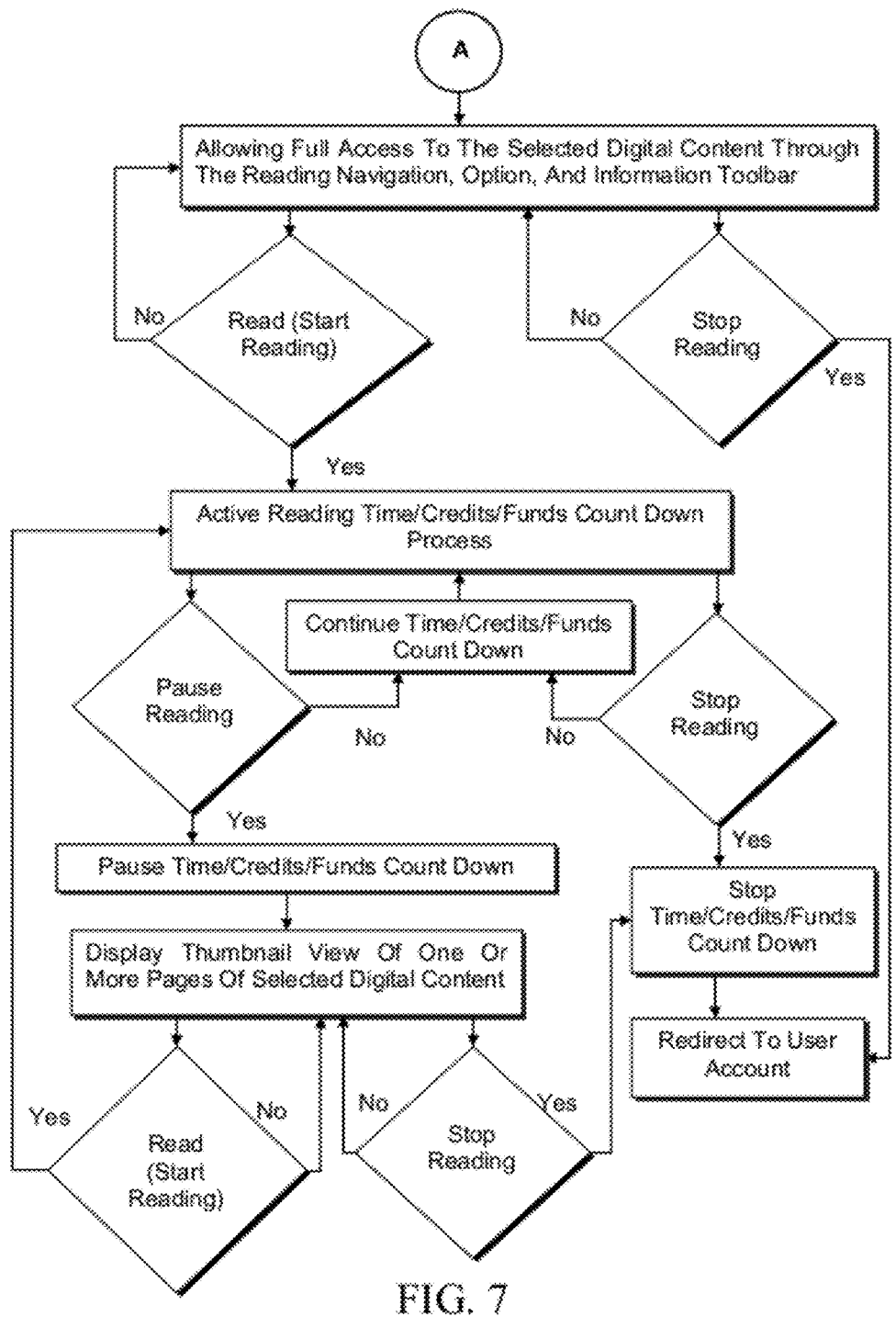

Referring now to FIGS. 1, 6, and 7, and in one embodiment, the interactive online reading system 10 is comprised of an interactive online reading method 140 for allowing users to interactively read digital content online.

In use and operation, the interactive online reading method 140 comprises the following steps. Launching the web browser 54 on at least one client system 50 that is connected to the Internet 48. Then, interfacing with the Web browser 54 by typing a specific URL (uniform resource locator) for the interactive reading website 40 (e.g., www.bookstep.com) or by clicking on a previously stored link associated with the specific URL to navigate to the interactive reading website 40. This navigation is accomplished by the web browser 54 sending the URL request to the Internet 48 and routers examining the request and then sending the request to the interactive online reading server 20 based on the results of the examination. In turn, the interactive online reading server 20 receives the request and sends the information which, in this case is the home web page 44 of the interactive reading website 40, back to at least the one client system 50. The information is then displayed on the display 52 of at least the one client system 50 via the web browser 54. The displayed web page can include text and graphics as well as videos and music such that the information can define a multimedia publication.

Once the user has navigated to the interactive reading website 40, the website 40 provides a set of navigation options that allow the user to browse, search, and/or find desired digital content such as a digital textbook from the digital publications database 100. With the desired content located, the user can use user input means 96 such as a mouse, keyboard, or touch screen to interface with an image or text link to the desired digital content to see a preview of the selected digital content or document 102 as illustrated in FIG. 3.

Next, the interactive online reading method 140 comprises the steps of determining if the user is logged into the interactive reading website 40 and displaying the preview of the selected digital content in the reading window 58 of the interactive user-controlled interface 56 (FIG. 3). In one embodiment, and as illustrated in FIG. 3, the preview of the selected digital content or document 102 is displayed as one or more thumbnails of one or more pages of the selected digital content or documents 102.

Without logging into the interactive reading website 40, the user is simply limited to the preview of the selected digital content or document 102. When the user is logged into the website 40 of reading server 20, the interactive online reading method 140 includes of the step determining if there are funds available in an account of the user. If funds are not available, the user is given an option to purchase or transfer funds to the account of the user and purchase time/credits for use during an active reading session. If funds are available, and time/credits have been purchased for use during an active reading session, the user is allowed full access to the selected digital content 102 via the reading navigation, option, and information toolbar 60 of the interactive user-controlled interface 56 as delineated in detail hereinabove.

Referring now to FIG. 7, the interactive online reading method 140 further comprises the steps of determining if the user has selected the read/start button 66 or the stop reading button 70 (FIG. 4). If neither the read/start button 66 nor the stop reading button 70 is selected, full access to the selected digital content remains operational. If the stop reading button 70 is selected, a redirection step to the account of the user is performed. If the read/start button 66 is selected, the active reading time/credit/fund countdown process 24 (FIG. 1)

starts. Accordingly, the period of purchased time/credits/funds starts to be counted down only when the user selects/actuates the read/start button 66 thereby defining a start of an active reading period (FIG. 5).

With the read/start button 66 is selected, the interactive online reading method 140 comprises the steps of determining if the user has selected the pause reading button 68 or the stop reading button 70. If neither the pause reading button 68 nor the stop reading button 70 is selected, the time/credits/funds countdown continues. Accordingly, the purchased time/credits/funds continue to be counted down and the current active reading period remains in effect (FIG. 5). If the pause reading button 68 is selected, the time/credits/funds countdown is paused. When paused, the selected digital content or document 102 is hidden by, for example, displaying a thumbnail view of one or more pages of the selected digital content as illustrated in FIG. 3. If the stop reading button 70 is selected, the time/credits/funds countdown is stopped and a redirection step to the account of the user is performed.

After the pause reading button 68 is selected, the interactive online reading method 140 comprises the steps of determining if the user has again selected the read/start button 66 or if the user has selected the stop reading button 70. If the read/start button 66 is selected, the hidden selected digital content or document 102 is once again displayed as it was when the pause button 68 was previously selected and the time/credits/funds countdown starts again from the point of time of when the pause button 68 was previously selected thereby restarting the active reading period. If the stop reading button 70 is selected after the pause reading button 68 is selected, the redirection process to the account of the user is performed.

Login Process

Figure 8:
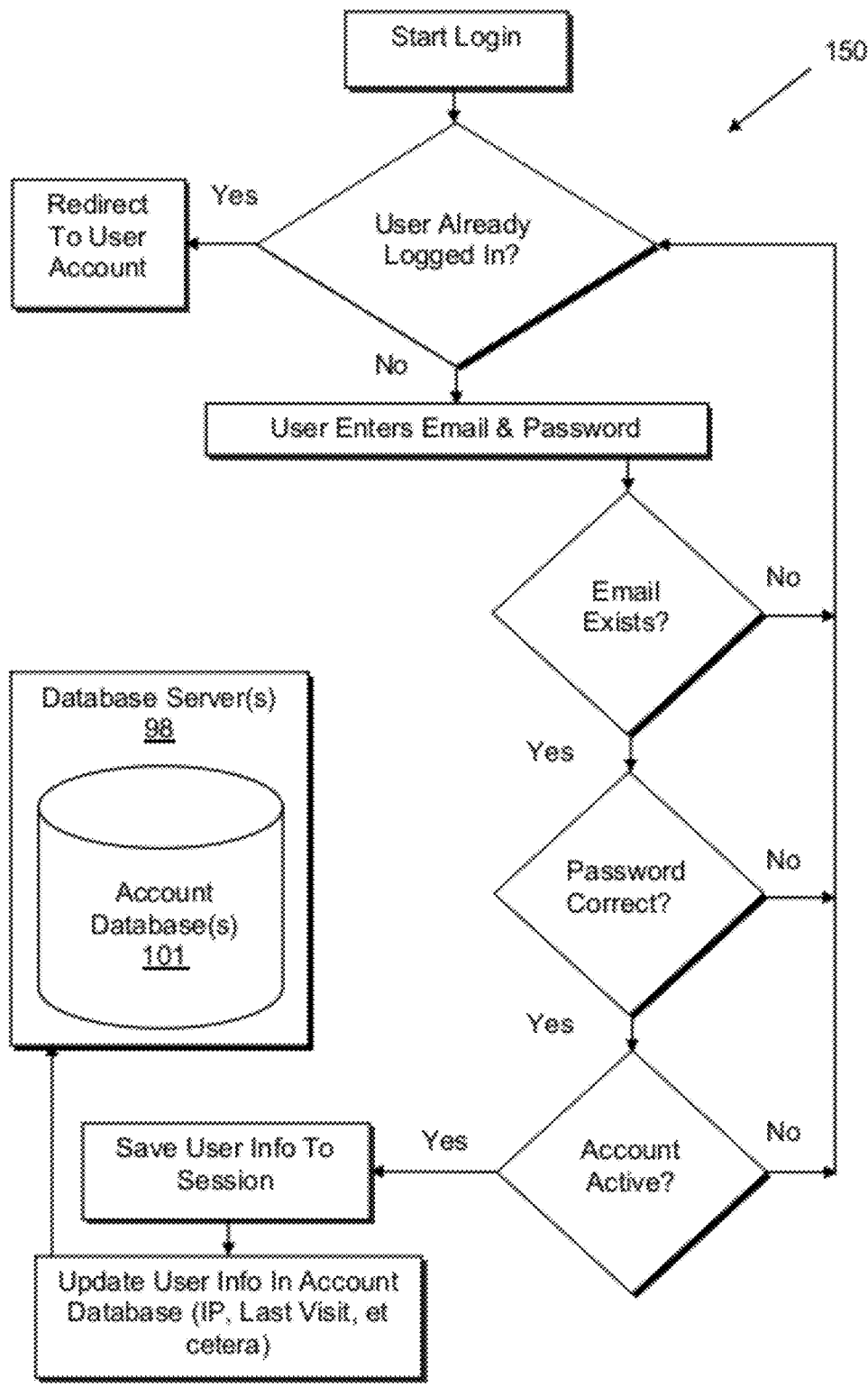
FIG. 8 is a flow diagram of an embodiment of a login process of an embodiment of the interactive online reading process.

FIG. 8 illustrates a detailed flow diagram of an embodiment of a user login process 150 of the interactive online reading method 140 of the interactive online reading system 10. The login process 150 initially performs a step of determining if the user is already logged in to the interactive reading website 40. If the user is already logged in, the user is directed to the account of the user. If the user is not logged in, the user is prompted to enter ones e-mail and password.

Then, the login process 150 determines if the entered email exists and, if not, the user is looped back to restart the login process 150. If the email does exist, the login process 150 determines if the password matches what is on file or, in other words, if the password is correct. If the password is not correct, the user is looped back to restart the login process 150. If the password is correct, the login process 150 determines if the account is active. If the account is not active, the user is looped back to restart the login process 150. If the account is active, the interactive online reading method 140 saves user information to a session and updates the user's information (IP, Last Visit, et cetera) in a user account database 101.

Preview Selected Digital Content Process

Figure 9:
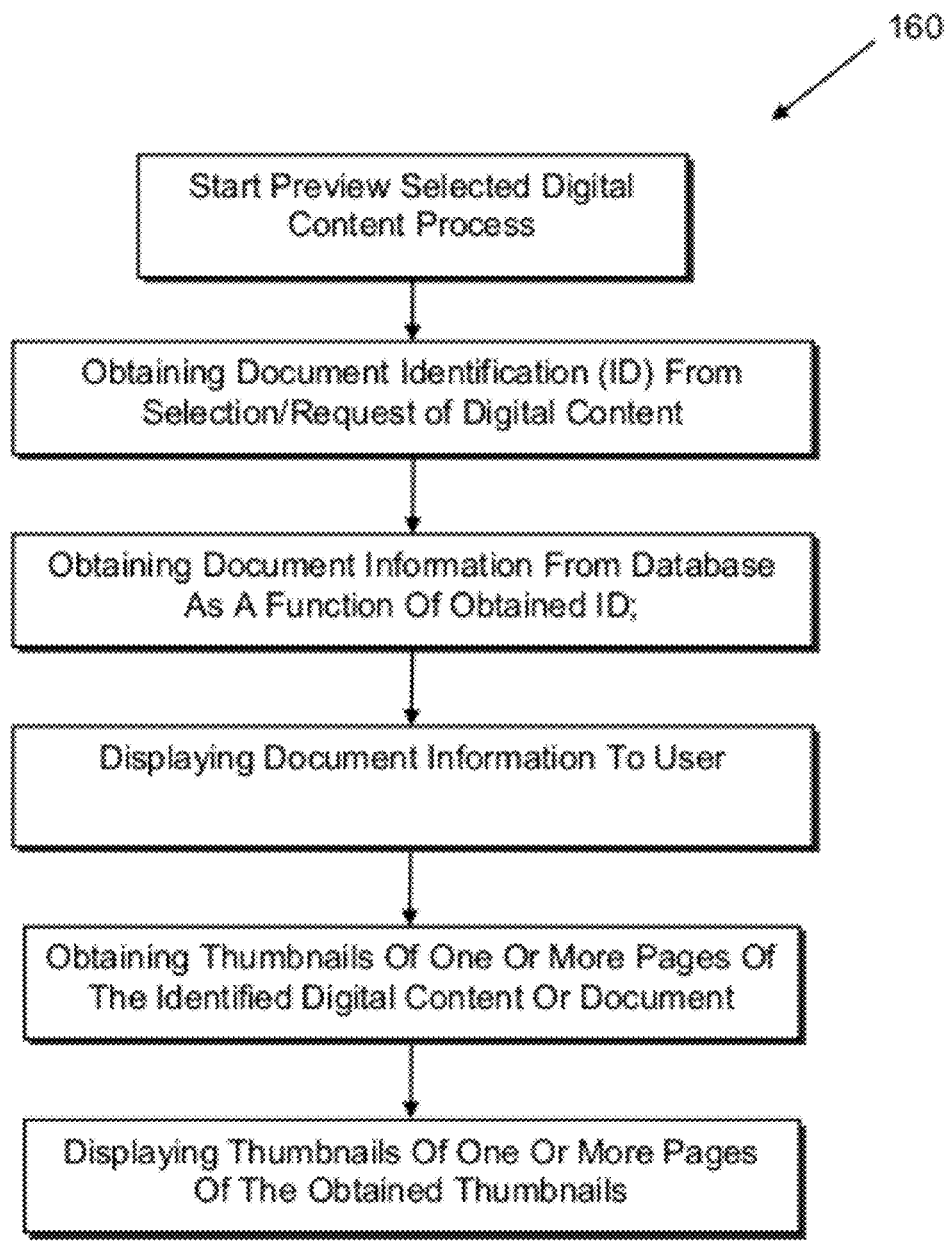
FIG. 9 is a flow diagram of an embodiment of a preview selected digital content process of an embodiment of the interactive online reading process.

FIG. 9 illustrates a detailed flow diagram of an embodiment of a preview selected digital content process 160 of the interactive online reading method 140 of the interactive online reading system 10. After the step of selecting digital content or document 102 is performed by the user, the preview selected digital content process 160 performs the steps of: obtaining document identification (ID) from the selection or request of digital content, obtaining document information from the digital publications database 100, displaying the document information to the user via the web browser 54, obtaining thumbnails of one or more pages of the digital content or document, and displaying the thumbnails of one or more pages of the digital content or document in the reading window 58 of the interactive user-controlled interface 56 displayed on the web browser 54 as illustrated in FIG. 3.

Purchasing/Transferring of Funds Process

Figure 10:
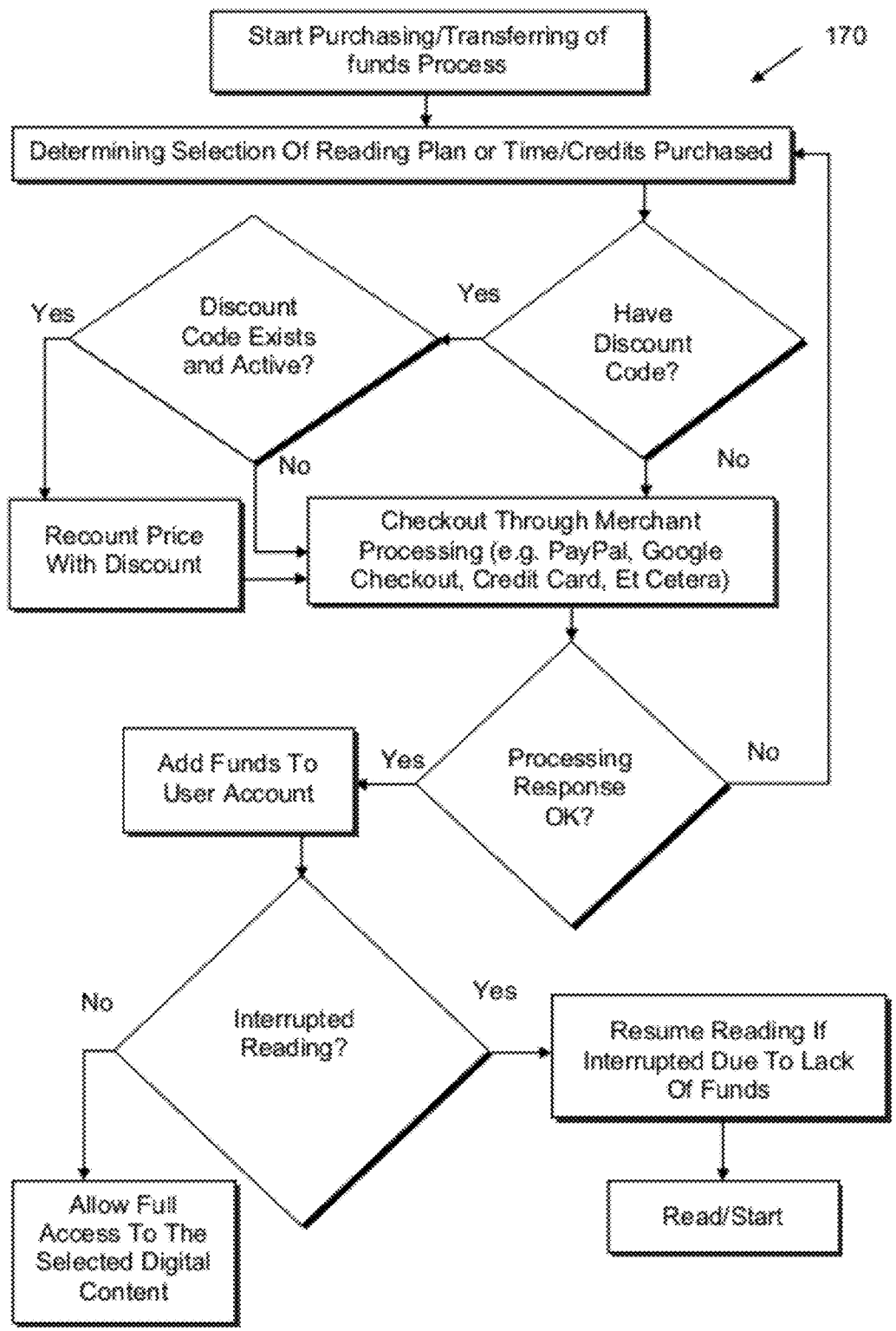
FIG. 10 is a flow diagram of an embodiment of a purchasing/transferring of funds process of an embodiment of the interactive online reading process.

FIG. 10 illustrates a detailed flow diagram of an embodiment a purchasing/transferring of funds process 170 of the interactive online reading method 140 of the interactive online reading system 10.

The purchasing/transferring of funds process 170 comprises the following steps. Determining a selection of a reading plan or amount of reading time or credits purchased by the user. Determining if the user has a discount code and, if not, checking the user out through merchant processing (e.g., PayPal, GOOGLE Checkout, Credit Card, et cetera) or, if so, determining if the discount code exists and is active. Recounting the price for the purchased reading time with the discount if the discount code exists and is active and then, checking the user out through the merchant processing. If the discount code does not exist or is not active, the price is not discounted and the user is checked out through the merchant processing. Next, determining if the merchant processing response is acceptable. Then, looping back up to the process block of determining selection of a reading plan or amount of reading time/credits purchased by the user if the merchant processing response is unacceptable or adding funds to the account of the user if the merchant processing response is acceptable. Then, determining if reading was interrupted due to a lack of user time/credits/funds and resuming reading if interrupted or allowing full access to the selected digital content through the interactive user-controlled interface 56.

Browse/Search/Find Desired Digital Content Process

Figure 11:
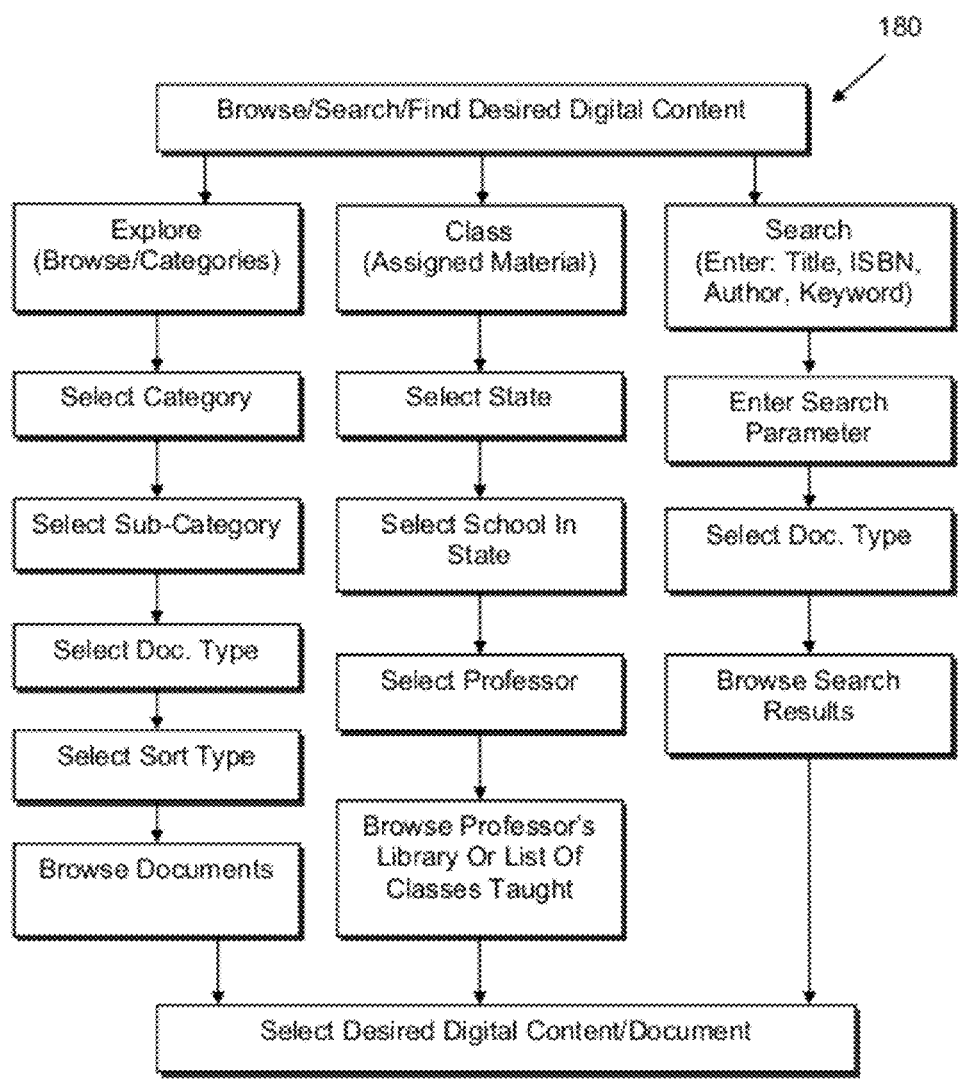
FIG. 11 is a flow diagram of an embodiment of a browse/search/find desired digital content process of an embodiment of the interactive online reading process.

FIG. 11 illustrates a detailed flow diagram of an embodiment of a browse, search, or find process 180 of the interactive online reading method 140 of the interactive online reading system 10.

In one embodiment, the browse, search, and find process 180 is comprised of a process for exploring digital content by browsing categories, selecting a category, selecting a sub-category, selecting a digital content/document type from the selected sub-category, selecting a sorting type, browsing the sorted digital content/documents, and selecting the desired digital content/documents from the sorted results.

Additionally, and in one embodiment, the browse, search, or find process 180 is comprised of a process for finding, for example, textbooks, class notes, lectures, et cetera. For example, the method for finding an assigned textbook or other assigned material is comprised of selecting a state from an image map, selecting a school such as a University or College from a list of schools in the selected state, selecting a professor from a list of professor's teaching at the selected school, browsing the professor's library of digital content/documents or browsing the digital content/documents associated with a list of classes taught by the professor, and selecting the desired digital content/document.

Furthermore, and in one embodiment, the browse, search, or find process is comprised of a process for searching digital content/documents by entering search parameters such as a Title, an ISBN, an Author, and/or a keyword; selecting a digital content/document type, browsing the results, and selecting the desired digital content/document from the results.

Encrypting and Decrypting Process

Figure 12:
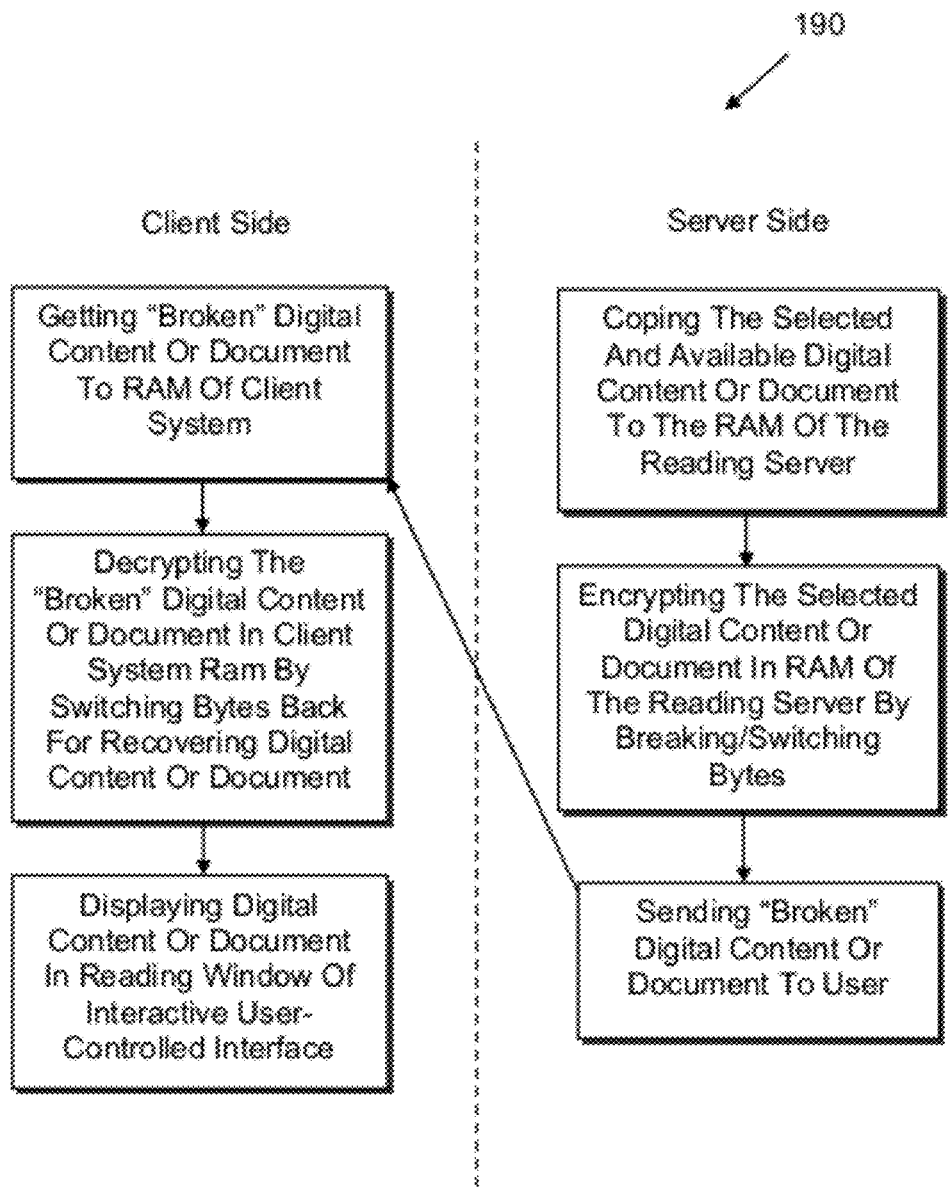
FIG. 12 is a flow diagram of an embodiment of a document encrypting and decrypting process of an embodiment of the interactive online reading process.

Referring now to FIG. 12, and in one embodiment, the interactive online reading method 140 of the interactive online reading system 10 is further comprised of encrypting and decrypting process 190.

In use and operation, and in one embodiment, the encrypting and decrypting process 190 comprises the following steps. Copying the selected and available digital content or document into the RAM of reading server 20. Encrypting the selected digital content or document in the RAM of the reading server 20 by breaking the selected digital content or document by switching bytes. Getting the "broken" digital content or document to the RAM of at least one client system 50. Decrypting the "broken" digital content or document in the RAM of at least the one client system 50 by switching bytes back for recovering the selected digital content or document for reading. And, displaying the selected digital content or document in the reading window 58 of the interactive user controlled interface 56 as illustrated in FIG. 5.

Interactive Online Reading Process Including Encrypting/Decrypting

In one embodiment, and referring to drawings, the interactive online reading process 140 includes the encrypting and decrypting process 190 for allowing users to interactively read selected digital content/documents 102 online.

Figure 13:
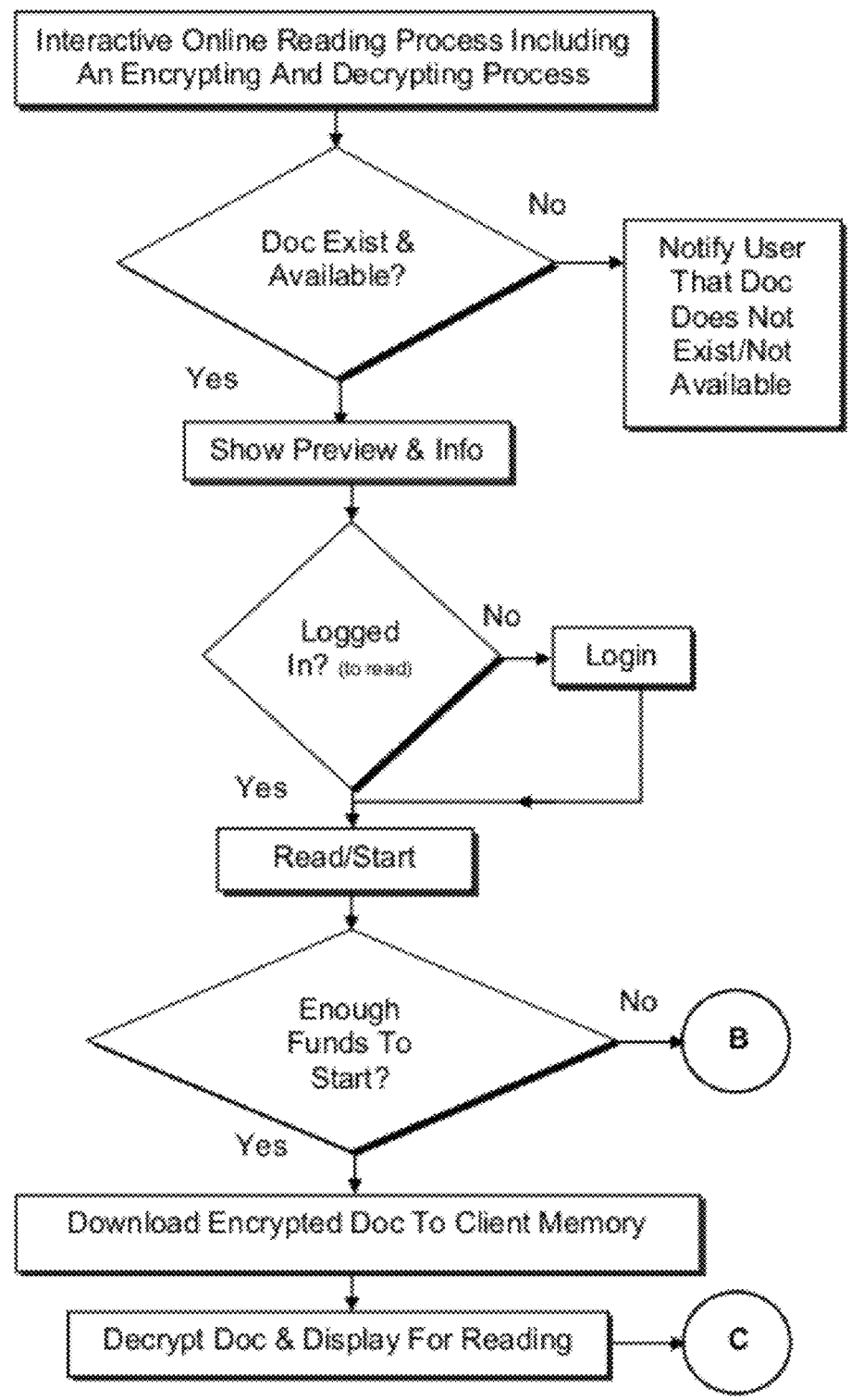
FIGS. 13 and 14 are detailed flow diagrams of an embodiment of the interactive online reading process comprising the encrypting and decrypting process.
Figure 14:
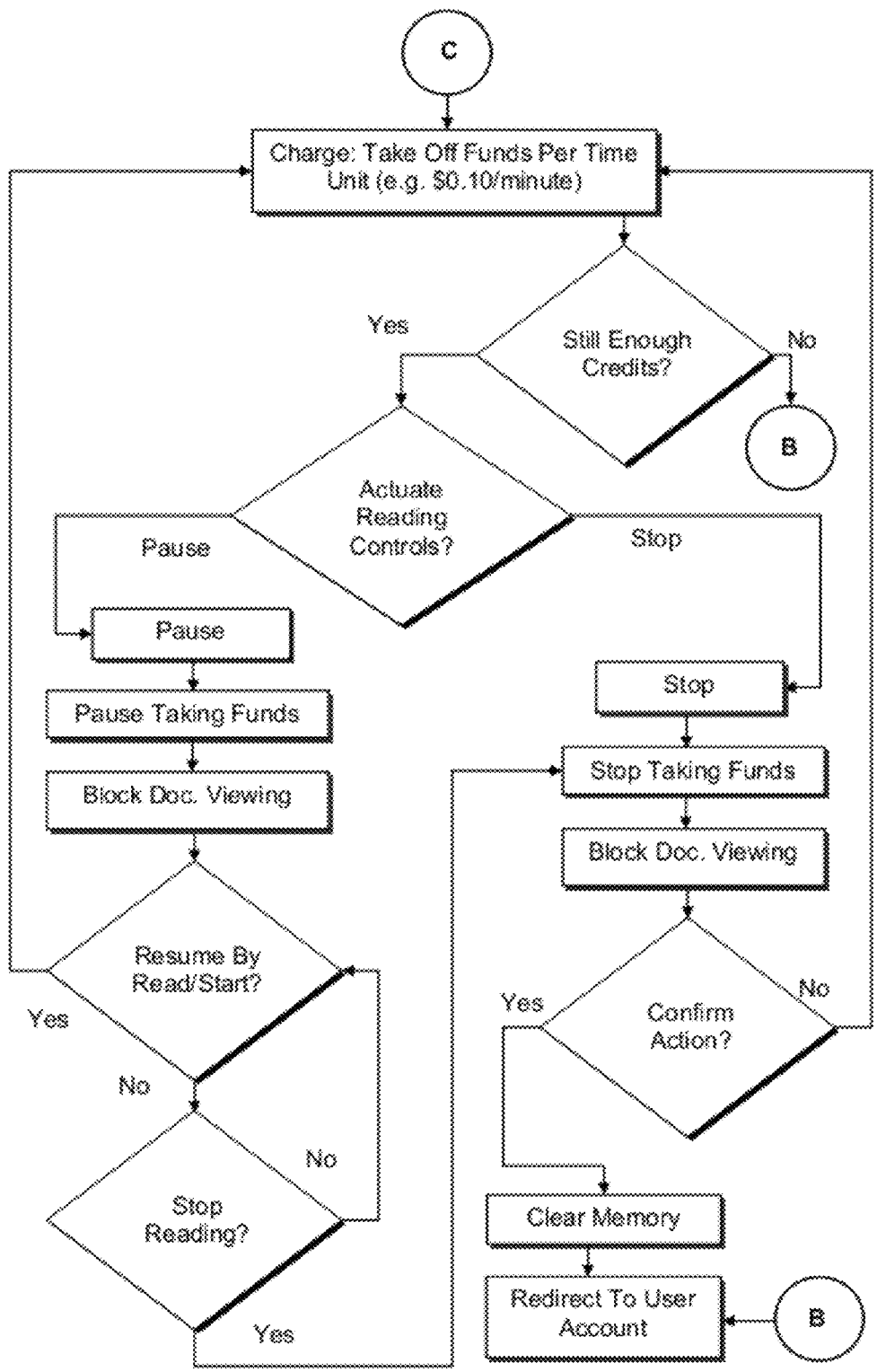

In use and operation, and as illustrated in FIGS. 13 and 14, the interactive online reading process 140 including the encrypting and decrypting process 190 comprises the following steps. Determining if a user selected digital content/document (Doc) exists and is available. Notifying the user if the selection does not exist and/or is not available or showing a preview of the selected digital content/document 102 to the user along with information associated with the selection if the selection exist and is available. Then, determining if the user is logged into the interactive reading website 40. If the user is not logged in, the user logs into the interactive reading website 40 and, if the user is logged in, the user selects the read/start button 66.

Next, determining if the user has enough purchased or transferred funds to start reading the selected digital content/document 102 or, in other words, has enough of a purchased period of time or a purchased amount of credits to start reading the selected digital content/document 102. Redirecting the user to a redirection process if the user does not have enough funds to start or, alternatively, downloading the selected digital content/document 102 in an encrypted format to the RAM of at least the one client system 50 if the user does have enough funds to start. Decrypting the document in the RAM of at least the one client system 50 and displaying the document for reading by the user on the display 52 of at least the one client system 50 via the interactive user-controlled interface 56 displayed on the web browser 54.

Now, counting down time/credits/funds or, in other words, taking off funds from the total amount of funds used to purchase the time/credits at a predefined amount for a predefined period of time thereby defining a start of an active reading session or period. While reading, determining if the counted down amount of purchased time/credits/funds are enough for continuing the active reading session or period and, if so, continuing to count down time/credits/funds at the predefined amount for the predefined period of time or, alternatively, redirecting the user to the account of the user for purchasing or transferring funds for continuing the active reading session or period.

Additionally, and during the active reading session or period, determining if the user has selected the pause reading button 68 or the stop reading button 70. If neither the pause reading button 68 nor the stop reading button 70 is selected, the time/credits/funds continue to be counted down and the current active reading period remains in effect. If the pause reading button 68 is selected, the time/credits/funds countdown is paused. When paused, the selected digital content/document 102 is blocked or hidden by, for example, displaying a thumbnail view of one or more pages of the selected digital content/document as illustrated in FIG. 3.

After the selected digital content/document is blocked or hidden, a step of determining if the user has again selected the read/start button 66 or if the user has selected the stop reading button 70 is performed. If the read/start button 66 is selected, the hidden selected digital content/document is once again displayed as it was when the pause button 68 was previously selected and the time/credits or funds countdown starts again from the point of time of when the pause button 68 was previously selected. Accordingly, the time/credits/funds start to be counted down again when the user selects the read button 66 thereby restarting the active reading period. If the stop reading button 70 is selected after the pause reading button 68 is selected, the time/credits/funds countdown stops and the document is blocked or hidden. Next, a step of confirming the stop selection is determined. If the stop selection is confirmed, the selected digital content/document 102 is cleared from RAM of at least the one client system 50, and the user is redirected to the account of the user, or alternatively, if the stop selection is denied, the reading process resumes and the hidden or blocked selected digital content/document 102 is once again displayed as it was when the stop button 70 was previously selected and the time/credits/funds countdown starts again from the point of time when the stop button 70 was previously selected.

Accordingly, and in one aspect, an embodiment of the invention provides an interactive online reading system 10 for reading digital content online for a period of purchased time which is counted down only during a user activated reading session and wherein the countdown of the period of purchased time can be subsequently paused or stopped by the user for controlling costs over the user's reading and learning preferences.

In another aspect, an embodiment of the invention provides an interactive online reading system 10 that reduces the average digital content cost and particularly textbook cost, and, at the same time increases or broadens the consumer base for publishers based on, for example, the economics that the system 10 provides highly desirable and affordable digital content such as textbooks thereby being consumed in a greater number of readings.

In another aspect, an embodiment of the invention provides an interactive online reading system 10 comprised of the reading navigation, option, and information toolbar 60 for managing and monitoring of reading progress.

In another aspect, an embodiment of the invention provides an interactive online reading system 10 that allows the user with the option of buying more access time or obtaining a refund on any remaining balance of time/credits/funds.

In another aspect, an embodiment of the invention provides an interactive online reading system 10 in the form of a digital content cloud computing system wherein an interactive reading application is delivered to user devices or client systems through the internet as an on-demand service.

In another aspect, the Network 48 may include a local area network (LAN), a wide area network (WAN), a telephone network, such as the Public Switched Telephone Network (PSTN), an intranet, the Internet, broadband and/or satellite and/or televised communications, such as OpenCable (OCAP) and/or DirecTV and/or television, including HDTV, or a combination of networks.

In a further aspect, the user device or client system 50 may take the form of, but not be limited to, a personal computer, a notebook computer, a netbook computer, a personal digital assistant (PDA), a wireless telephone including a smartphone, a television, including HDTV, a settop box (STB), a terminal and/or display, a kiosk, a video game console, a media center, a multimedia center, or another type of computation or communication device, or a combination of these devices.

The above delineation of the system 10, including its processes and aspects demonstrate the industrial applicability of this invention.

Moreover, it should be apparent that numerous modifications and adaptations may be resorted to without departing from the scope and fair meaning of this invention as set forth hereinabove and as described herein below by the claims.

I claim:

1. A computer-implemented online interactive reading method, said method comprising the steps of:
utilizing an interactive online reading server having a countdown timer and an interactive user-controlled interface configured to display digital content for counting down a value correlative to an amount of time purchased for accessing digital content selected by a user only while the user selected digital content is displayed on the interactive user-controlled interface configured to display digital content for user interpretation; and
allowing the user to control a subsequent suspension of the counting down of the value in return for the selected digital content being concealed from being displayed by the interactive user-controlled interface for precluding user interpretation of the selected digital content.

2. The method of claim 1, wherein the user selected digital content is a book.

3. The method of claim 2, wherein the book is a textbook.

4. A computer-implemented online interactive reading method, said method comprising the steps of:
counting down a purchased amount of time under control of a user actuated set of icons, the set of icons including a first icon button to start counting down the purchased amount of time, a second icon button to pause counting down the purchased amount of time, and a third icon button to stop counting down the purchased amount of time;
determining whether the first icon button has been actuated by the user;
displaying user selected digital content on a display of a client sent from a server networked to the client in response to determining that the first icon button has been actuated by the user;
determining whether the second icon button has been actuated by the user;
pausing counting down the purchased amount of time in response to determining that the second icon button has been actuated by the user;
determining whether the third icon button has been actuated by the user; and
stopping counting down the purchased amount of time in response to determining that the third icon button has been actuated by the user.

5. The method of claim 4, wherein the user selected digital content is a book.

6. The method of claim 5, wherein the book is a textbook.

7. The method of claim 4, comprising encrypting the user selected digital content prior to the user selected digital content being sent from the server to the client and decrypting the user selected digital content prior to displaying the user selected digital content on the display of the client.

8. The method of claim 4, comprising displaying on the display of the client the counting down of the purchased amount of time in time increments.

9. The method of claim 4, comprising displaying on the display of the client the counting down of the purchased amount of time in credit increments.

10. An interactive online reading system comprising:
an interactive online reading server having a countdown timer and an interactive user-controlled interface configured to display digital content;
a user operated client system operatively coupled to said interactive online reading server, said user operated client system having a display and a browser configured to display said interactive user-controlled interface;
means for selecting digital content;
means for displaying said selected digital content on said interactive user-controlled interface only when said countdown timer is counting down a period of time purchased for accessing said selected digital content; and
user control means for starting, pausing, and stopping said countdown timer for controlling the counting down of said period of time purchased for accessing said selected digital content for allowing the user to only pay for an active reading session during which said selected digital content is displayed on said display for user interpretation only while said countdown timer is counting down said period of time purchased and wherein said selected digital content is concealed from being displayed on said display for user interpretation when said countdown timer is paused or stopped.

11. The system of claim 10, wherein the selected digital content is a book.

12. The system of claim 11, wherein the book is a textbook.

13. The system of claim 10, further comprising means for displaying in time increments the counting down of the period of the time purchased for accessing said selected digital content on said interactive user-controlled interface.

14. The system of claim 10, further comprising means for displaying in credit increments the counting down of the period of the time purchased for accessing said selected digital content on said interactive user-controlled interface.

15. A non-transitory computer-readable medium containing computer-executable instructions that, when executed by a processor, cause the processor to perform an online interactive reading method, said method comprising:
counting down a value correlative to an amount of time purchased for accessing user selected digital content only while the selected digital content is displayed on a display for user interpretation; and
allowing the user to control a subsequent suspension of the counting down of the value in return for the selected digital content being concealed from the display.

* * * * *